United States Patent
Yeh et al.

(10) Patent No.: US 9,696,779 B2
(45) Date of Patent: Jul. 4, 2017

(54) INTEGRATED CIRCUIT, ELECTRONIC DEVICE AND OPERATION METHOD THEREOF

(71) Applicant: Nuvoton Technology Corporation, Hsinchu (TW)

(72) Inventors: Shih-Hao Yeh, Yangmei (TW); Shih-Hsuan Yen, Zhubei (TW); Shih-Hsin Su, Taoyuan (TW)

(73) Assignee: Nuvoton Technology Corporation, Hsinchu (TW)

( * ) Notice: Subject to any disclaimer, the term of this patent is extended or adjusted under 35 U.S.C. 154(b) by 436 days.

(21) Appl. No.: 14/093,313

(22) Filed: Nov. 29, 2013

(65) Prior Publication Data

US 2014/0089710 A1    Mar. 27, 2014

Related U.S. Application Data

(63) Continuation-in-part of application No. 12/547,003, filed on Aug. 25, 2009, now abandoned.

(30) Foreign Application Priority Data

Aug. 9, 2013    (TW) .............................. 102128594 A

(51) Int. Cl.
*G06F 1/00* (2006.01)
*G06F 1/32* (2006.01)
*H04W 52/02* (2009.01)

(52) U.S. Cl.
CPC .............. *G06F 1/32* (2013.01); *G06F 1/3203* (2013.01); *G06F 1/3209* (2013.01);
(Continued)

(58) Field of Classification Search
CPC ........ G06F 1/32; G06F 1/3203; G06F 1/3215; G06F 1/3209; H04W 52/0296; Y02B 60/1282; Y02B 60/50
(Continued)

(56) References Cited

U.S. PATENT DOCUMENTS

| 6,510,523 B1 | 1/2003 | Perlman et al. |
| 6,741,836 B2 * | 5/2004 | Lee ....................... G06F 1/3203 |
| | | 375/E1.002 |

(Continued)

FOREIGN PATENT DOCUMENTS

| TW | 200729902 | 8/2007 |
| TW | 201249119 | 12/2012 |

OTHER PUBLICATIONS

Taiwanese Office Action of its corresponding TW application issued on Oct. 22, 2015; pp. 1-11.

*Primary Examiner* — Tim T Vo
*Assistant Examiner* — Kim T. Huynh
(74) *Attorney, Agent, or Firm* — Muncy, Geissler, Olds & Lowe, P.C.

(57) ABSTRACT

An embodiment of the invention provides an electronic device. The electronic device includes a first wireless module, a second wireless module and a controller. The first wireless module is controlled by a chipset to communicate with a portable device. The second wireless module communicates with the portable device. The controller is coupled to the second wireless module. When the first wireless module and the chipset are disabled, the electronic device receives a signal from the portable device via the second wireless module.

20 Claims, 6 Drawing Sheets

(52) U.S. Cl.
CPC .......... *G06F 1/3215* (2013.01); *G06F 1/3278* (2013.01); *G06F 1/3287* (2013.01); *H04W 52/0296* (2013.01); *Y02B 60/126* (2013.01); *Y02B 60/1282* (2013.01); *Y02B 60/50* (2013.01)

(58) Field of Classification Search
USPC ................................. 713/300–340; 455/41.2
See application file for complete search history.

(56) References Cited

U.S. PATENT DOCUMENTS

| | | |
|---|---|---|
| 6,882,942 B1 | 4/2005 | Duduman |
| 6,970,080 B1 | 11/2005 | Crouch et al. |
| 7,017,052 B2 | 3/2006 | Magee et al. |
| 7,017,057 B2 * | 3/2006 | Magee .................. G06F 1/3203 455/404.2 |
| 7,061,366 B2 | 6/2006 | Bell et al. |
| 7,603,145 B2 | 10/2009 | Zinn et al. |
| 7,917,780 B2 | 3/2011 | Hu |
| 2005/0225427 A1 | 10/2005 | Bell et al. |
| 2007/0057763 A1 | 3/2007 | Blattner et al. |
| 2007/0133160 A1 | 6/2007 | Ma |
| 2008/0072086 A1 * | 3/2008 | Kim ...................... G06F 1/3203 713/323 |
| 2008/0129577 A1 * | 6/2008 | Pan ...................... G06F 21/567 341/175 |
| 2010/0022188 A1 * | 1/2010 | Nakagawa ............... H04B 5/02 455/41.2 |

* cited by examiner

INTEGRATED CIRCUIT, ELECTRONIC DEVICE AND OPERATION METHOD THEREOF

CROSS REFERENCE TO RELATED APPLICATIONS

This application claims priority of Taiwan Patent Application No. 102128594, filed on Aug. 9, 2013, and is a Continuation-In-Part of application Ser. No. 12/547,003, filed Aug. 25, 2009, and entitled "COMPUTER SYSTEM, INTEGRATED CHIP, SUPER IC/MODULE AND CONTROL METHOD OF THE COMPUTER SYSTEM", the entirety of which are incorporated by reference herein.

BACKGROUND OF THE INVENTION

Field of the Invention

The present invention relates to an electronic device and more particularly to an electronic device which is capable of communicating with another electronic device via a wireless interface.

Description of the Related Art

Computers and portable devices become necessities in consumer's daily life. The consumer can use computers or portable devices to browse the web, receive or send e-mails or deal with business affairs. However, the applications between the computer and the portable device are not well developed. If the user wants to use the computer, the computer needs to be boot on first. If the user wants to use the portable device to access data stored in the computer, the user needs to turn on the computer first. It is not convenient to the user.

BRIEF SUMMARY OF THE INVENTION

An embodiment of the invention provides an electronic device. The electronic device includes a first wireless module, a second wireless module and a controller. The first wireless module is controlled by a chipset to communicate with a portable device. The second wireless module communicates with the portable device. The controller is coupled to the second wireless module. When the first wireless module and the chipset are disabled, the electronic device receives a signal from the portable device via the second wireless module.

Another embodiment of the invention provides an integrated circuit to process an input/output signal of an electronic device. The integrated circuit includes a controller and a switching device. The switching device is coupled to the wireless module, and is selectively coupled to the controller or a chipset, so as to establish a first connection between the wireless module and the chipset, or a second connection between the wireless module and the controller. When the electronic device is at an inactive state, the switching device establish the second connection and the controller receives and processes a signal from a portable device via the wireless module.

Another embodiment of the invention provides an operation method for an electronic device, wherein the electronic device comprises a chipset, a controller and a wireless module controlled by the chipset or the controller. The method includes steps of detecting a state of the electronic device; establishing a first connection between the controller and the wireless module when the state is an inactive state; establishing a second connection between the chipset and the wireless module when the state is an operation state; and executing a function corresponding to an input signal.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
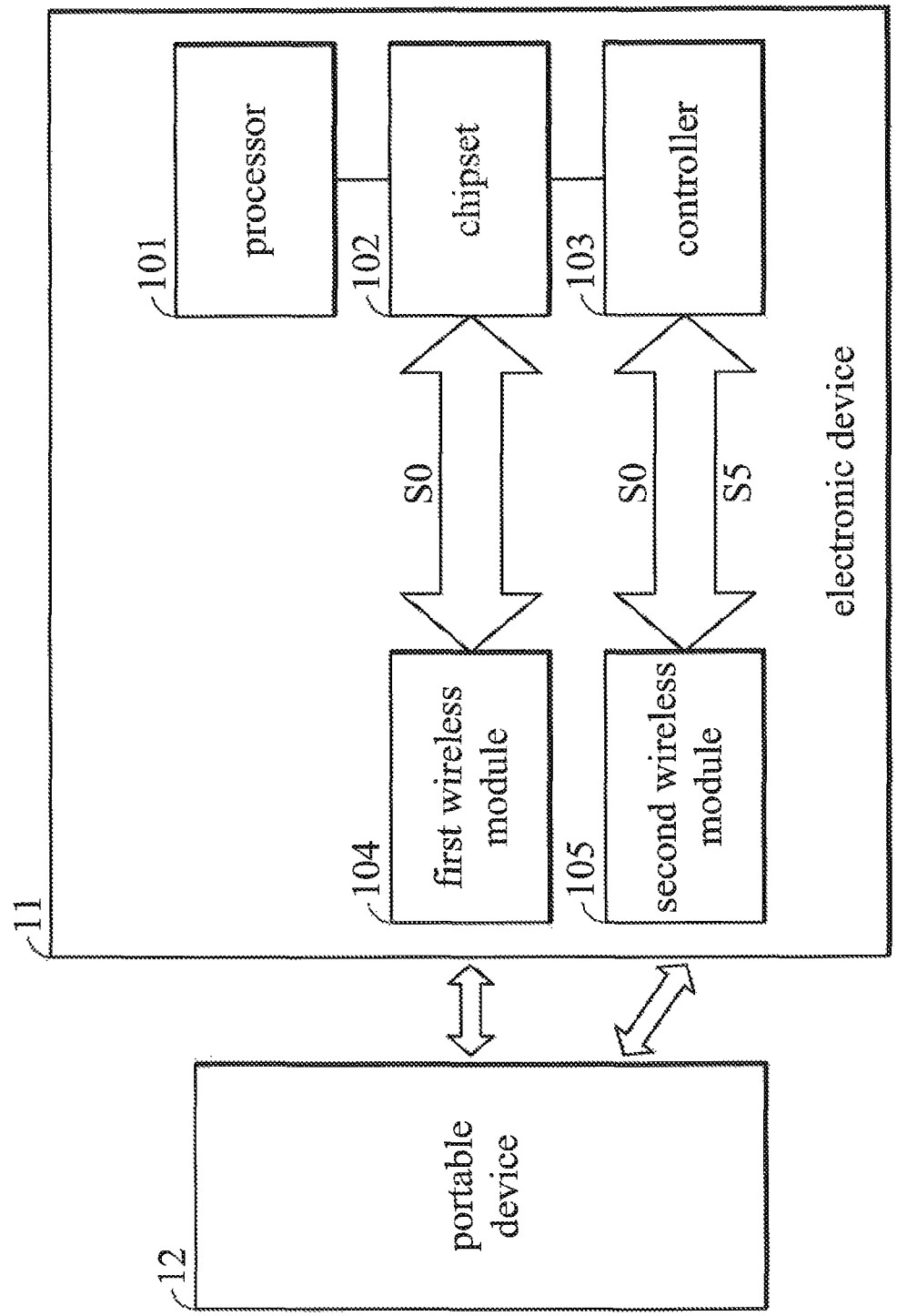
FIG. 1 is a schematic diagram of an electronic device with wireless communication device according to an embodiment of the invention.

FIG. 1 is a schematic diagram of an electronic device with wireless communication device according to an embodiment of the invention. The electronic device 11, such as a computer, can communicate with portable device 12, such as a tablet, a smart phone, via wireless communication device. The wireless communication device may be a Bluetooth communication device, a WiFi communication module, an IR communication module, a near field communication (NEC) module, a radio frequency (RF) communication module, a 3 G communication module (including CDMA module, WCDMA module or TD-SCDMA module), a 4 G communication module (including LTE module or WiMAX module) or other wireless module. In other embodiment, it can be implemented by two different wireless modules. In this embodiment, the module is implemented by hardware including chip, controller, storage device or other necessary circuits.

The electronic device 11 includes a processor 101, a chipset 102, a controller 103, a first wireless module 104 and a second wireless module 105. The controller 103 may be a super I/O controller or an embedded controller. The first wireless module 104 and the second wireless module 105 can communicate with the portable device 12. In one embodiment, only one of the first wireless module 104 and the second wireless module 105 can communicate with the portable device 12 during one time period. In another embodiment, the first wireless module 104 can communicate with one portable device and the second wireless module 105 can communicate with another portable device. In one embodiment, the processor 101 can generate a select signal to select the first wireless module 104 or the second wireless module 105 to communicate with the portable device 12.

In another embodiment, the processor can receive a select signal from the portable device 12 to select the first wireless module 104 or the second wireless module 105 to communicate with the portable device 12. In another embodiment, the processor 101 can select the first wireless module 104 or the second wireless module 105 to communicate with the portable device 12 according to the operating state of the electronic device 11. For example, assuming the loading of the processor 101 is under a threshold, the processor 101 can select the first wireless module 104 to communicate with the portable device 12. If the loading of the processor 101 is higher than the threshold, the processor 101 can select the second wireless module 105 to communicate with the portable device 12. The data transmission and reception is processed by the controller 103, not the processor 101, after the second wireless module 105 is selected. The loading is related to the usage of the processor in this embodiment.

ACPI (Advanced Configuration and Power Interface) standard is a power standard and the operating system can manage the power situations of different devices. The embodiment is illustrated with the power states of the ACPI (Advanced Configuration and Power Interface) standard. The power states include states S0, S1, S2, S3, S4 and S5. The following paragraphs describe, the meaning and the function of each power state.

S0 (working state): The electronic device operates normally in state S0.

S1 (POS, Power on Suspend): At state S1, a central processor of the electronic device is turned off by a bus clock, but other hardware still operates normally.

S2: The bus clock and the central processor are turned off, but other hardware still operates normally.

S3 (sleeping state, or called standby state): At this state, the main memory, the super I/O controller and the embedded controller of the electronic device (For instance, RAM, the super I/O controller and the embedded controller of the computer) are still receiving power, and may be the only powered elements in the electronic device. Since the operating system, programs and opened files are all temporarily saved in the main memory (RAM), the content temporarily saved in the main memory (RAM) is not be changed when the electronic device changes its power state from the power state S3 to another power state, such as the power state S0. Thus, the user can recover the computer to previous state. At the power state S3, the private information of any executed program, such as an opened file, is not written to a nonvolatile memory, such as a hard drive or a solid state disk.

S4 (sleeping mode): The power states S3 and S4 are sleeping modes, but the hardware configurations of the computer at the states are different. At the power state S4, most elements of the computer are not powered on. At this state, all the contents temporarily saved in the main memory (RAM) are stored in a nonvolatile memory, such as a hard drive, to protect the current state of the computer. The content of the current state comprises programs, and opened files. In other words, when the computer is resumed from the power state S4, the original working state is available for the user. This is the same result as when the computer is resumed from the power state S3 to the original working state, such as the power state S0. The difference between the power states S3 and S4 is the time it takes to move the content of the main memory (RAM) to the nonvolatile memory, move the content from the nonvolatile memory to the main memory (RAM). Furthermore, the content stored in the power state S3 is lost when a power failure happens. In the power state S4, content is not lost during power failure because the content is stored in the hard drive.

S5 (soft off): The settings or functions of the power state S5 is similar to those in the power state S4 except that no data will be reserved by the operation system when entering the power state S5. When the computer is at the power state S5, the computer may be awaken via a LAN, keyboard or USB device because some components, such as south bridge, the super I/O controller, the network chip or the like, in the computer system are supplied with power at the power state S5 and the remaining components are turned off.

At the power state S3, S4 or S5, the processor 101, the chipset 102 and the first wireless module 104 are disabled because they are not powered. The controller 103 and the second wireless module 105 are still powered and the electronic device 11 can communicate with the portable device 12 via the second wireless module 105. In one embodiment, the controller 103 and the second wireless module 105 are at a power domain which is different from another power domain that remaining element of the electronic device 11 are at.

Generally speaking, the electronic device may provide one or a plurality of power domains by one or a plurality of power sources. In this embodiment, the power domain includes at least one module, circuit, a part of circuit or elements that shares the same power source. The power source provides at least, one voltage level to a plurality circuits, modules or elements in the power domain. At least one of module, circuit, a part of circuit or elements in the same power domain may be turned on or turned off simultaneously. In another embodiment, the power domain can be regarded as a combination of a processing unit, modules, circuit, a part of circuit or a part of different circuits. In another embodiment, the power domains are powered by different power sources.

For example, the processor 101, the chipset 102 and the first wireless module 104 are at a first power domain, and the controller 103 and the second wireless module 105 are at a second power domain. At the power states S3/S4/S5, the first power domain is not powered and only the second power domain is powered. Thus, the processor 101, the chipset 102 and the first wireless module 104 cannot work. Only the controller 103 and the second wireless module 105 can operate normally.

In other words, unless the electronic device 11 does not connect to any power source, the controller 103 and the second wireless module 105 are always powered no matter what the power state of the electronic device 11 is. The processor 101, the chipset 102 and the first wireless module 104 may not be powered due to the power state of the electronic device 11.

In this embodiment, at least one of the first wireless module 104 and the second wireless module 105 is powered to communicate with the portable device no matter what the power state of the electronic device 11. When the electronic device 11 is at the power state S3 or S5, the electronic device 11 can communicate with the portable device 12 via the second wireless module 105 because the controller 103 is powered. When the electronic device is at the power state S0, the first wireless module 104 and the second wireless module 105 are powered, and the processor 101 can select the first wireless module 104 or the second wireless module 105 to communicate with the portable device 12 via a select mechanism.

In this embodiment, an operation state (or called an executable state or an active state) and an inactive state are defined. The operation state indicates the electronic device 11 operates in a normal state, such as the power state S0 of the ACPI standard. The processor 101, chipset 102 and the controller 103 are powered when the electronic device 11 is at the operation state. The inactive state indicates that the electronic device 11 is not at the operation state. The inactive state may be sleeping state, power off, standby state or the state S3/S4/S5 of the ACPI standard. The processor 101 and the chipset 102 are not powered when the electronic device 11 is at the inactive state, but the controller 103 is still powered. When the electronic device 11 is at the operation state, the processor 101 can select the first wireless module 104 or the second wireless module 105 to communicate with the portable device 12. In other words, when the electronic device 11 is at the operation state, the first wireless module 104 and the second wireless module 105 can be controlled by the processor 101. When the electronic device 11 is at the inactive state, the processor 101 does not work and only the controller 103 can work. Thus, the controller 103 can control the second wireless module 105 to communicate with the portable device 12. The embodiment is illustrated with two wireless modules, but the invention can be applied to the electronic device with one wireless module. When the electronic device 11 is at the operation state, the wireless module is controlled by the processor 101. Before the electronic device 11 enters into the inactive state, the processor 101 transfers the control of the wireless module to the controller 103, and when the electronic device 11 is returned to the operational state from the inactive state, the processor 101 can transmit a control signal to the controller 103 and wireless module. Then, the control of the wireless module is transferred to the processor 101. The described features can be applied to other embodiments, not to limit to the embodiment of FIG. 1.

An application program is installed in the portable device 12. When the application program is executed, the portable device 12 can communicate with the electronic device 11 via a wireless interface, such as a Bluetooth interface, to acquire data stored in the electronic device 11. In another embodiment, when the electronic device 11 receives an input signal from the portable device 12, the electronic device 11 executes corresponding function. The following paragraphs describe some functions between the portable device 12 and the electronic device 11.

Information Display Function

When the user uses the portable device 12, the installed application program can transmit a request signal to the electronic device 11 via a third wireless module, such as a Bluetooth module (not shown in FIG. 1). If the electronic device 11 is in the operation state, such as power state S0, the first wireless module 104 can be enabled and the second wireless module 105 can be disabled, the first wireless module 104 can transmit the received request signal to the chipset 102. The chipset 102 can acquire information of the electronic device 11 from the sensors or operating system of the electronic device 11 and can transmit the information to the portable device 12. The information includes at least one of a temperature, a model, a current voltage, an operating frequency of the processor 101, a fan speed, time information, BIOS version of the electronic device 11, and memory information of the electronic device 11.

If the electronic device 11 is in the inactive state, such as standby or power-off, power state S3 or S5 of the ACPI standard, the first wireless module 104 is disabled, and the second wireless module 105 is enabled. The second wireless module 105 can transmit the received request signal to the controller 103. Before the electronic device 11 enters the inactive state, the chipset 102 can store the information of the electronic device 11 to a storage device, such as a flash memory or a memory of the controller 103. Thus, when the controller 103 receives the request signal, the controller 103 can acquire the information of the electronic device 11 from the storage device and can transmit the information to the portable device 12. The information includes at least one of a temperature, a model, a current voltage, an operating frequency of the processor 101, a fan speed, time information, BIOS version of the electronic device 11, and memory information of the electronic device 11.

In another embodiment, the sensors of the electronic device 11 are continuously powered and even the electronic device 11 is at the inactive state, the sensors still monitor the state of the electronic device 11 and transmit the detected information to the controller 103 continuously or periodically. In other embodiment, some sensors share the same power source of the controller 103 and other remaining sensors share the same power source of the chipset 102. Thus, the remaining sensors may not be powered in some situations.

Error Diagnostic Function

When errors are occurred in the electronic device 11, the electronic device 11 may not operate normally. For example, the electronic device 11 may not boot on normally. Under the abnormal situation, if the electronic device 11 is still connected to a power source, the first wireless module 104 is disabled and the second wireless module 105 is enabled. Since the controller 103 can operate independently, the controller 103 can transmit an abnormal signal to the portable device 12 via the second wireless module 105 when errors are occurred in the electronic device 11. In other embodiment, the user can determine whether to transmit a request signal to the controller 103 via the portable device 12.

When the controller 103 receives the request signal, the controller 103 can acquire an error information code and transmit the error information code to the portable device 12. The controller 103 may acquire the error information code via the port 80. Then, the user can access internet to perform a debugging operation for the electronic device 11 by using the portable device 12 in accordance with the received error information code. In one embodiment, the portable device 12 transmits the error information code to the internet for debugging, wherein the port 80 is a specific port for verifying and debugging in the current computer system. The port 80 is named because the address corresponding to the specific port is 80$h$.

In another embodiment, the controller 103 or the chipset 102 can generate the error information code directly and the controller 103 can transmit the error information code to the portable device 12 directly. In another embodiment, the chipset 102 generates the error information code and transmits the error information code to the controller 103. Then, the controller 103 transmits the error information code to the portable device 12. In another embodiment, the controller 103 transmits the error information code to the portable device 12 when receiving the request signal from the portable device 12. The error information code may be an error signal or an error code.

Wakeup Function

When the electronic device 11 is at the active state and the electronic device 11 is still connected to a power source, still only the second wireless module 105 and the controller 103 are powered and operate normally. The processor 101, chipset 102 and the first wireless module 104 are disabled or inactive. When the user transmits a booting command to the controller 103 via the portable device 12, the controller 103 transmits corresponding booting signal to the chipset 102 and the electronic device 11 then executes a booting procedure or a wakeup procedure accordingly.

In one embodiment, a first pin of the controller 103 is connected to a wakeup pin of the chipset 102 or a power pin of the mother board. When the logic state of the first pin is changed from a first logic level to a second logic level, the electronic device 11 executes booting procedure or a wakeup procedure.

In the described embodiments, the booting command is generated by the portable device 12 by using such as installed application programs, G-sensor, light detector and a first application program in electronic device 11 corresponding to the booting command to set the booting command.

For example, the user can set a specific action to generate the booting command by the application program installed in the portable device 12. The booting command may be generated when detecting the smart phone is shaken to left for three successive times and then shaken the portable device to right for successive times. In another embodiment, when the G-sensor detects the portable device is shaken to left side, a signal with logic state "0" is transmitted to the electronic device 11, and when G-sensor detects the portable device is shaken to right side, a signal with logic state "1" is transmitted to the electronic device 11. The user can set a first data [000111] as the booting command and transmits the first data to the electronic device 11. When the controller 103 receives data [000111] within a period of time, the controller 103 transmits corresponding booting signal to the chipset and the electronic device 11 then executes a booting procedure or a wakeup procedure accordingly.

Security Login Interface

When the User transmits a booting command to the controller 103 via the portable device 12, the controller 103 transmits corresponding booting signal to the chipset 102 and the electronic device 11 then executes a booting procedure or a wakeup procedure accordingly. Then, the user can transmit an unlock command to the controller 103 via the portable device 12. When the controller 103 receives the unlock command, a confirm signal can be transmitted to the chipset 102 or the processor 101, then the electronic device can display a login interface, and the user can input the account and password to get the access right of the electronic device 11 via the login interface. In this embodiment, the user can directly input the booting command and the unlock command via the portable device 12, or the booting command and the unlock command can be generated by the G-sensor or light sensor, such as the manner described in the wakeup function. In other embodiment, the user can transmit the unlock command to the chipset 12 under the operation state. When the chipset 102 confirms that the unlock command matches the stored data, the user can login the electronic device 11. In another embodiment, the electronic device 11 only shows the login interface for the user to input the account and password. The unlock command may be directly input by the user or generated by the G-sensor or light sensor.

Wireless Input Function

When the electronic device 11 is in the operation state, such as the power state S0, the portable device 12 can be served as an input device of the electronic device 11. When the electronic device 11 is at the state S0, the processor 101 can select the first wireless module 104 or the second wireless module 105 to receive the data from the portable device 12. In another embodiment, the portable device 12 can transmit a select signal to the electronic device 11 to select the first wireless module 104 or the second wireless module 105 for communication.

In one embodiment, the first wireless module 104 is connected to a first USB controller of the chipset 102 via a first USB interface and the second wireless module 105 is connected to a second USB controller of the controller 103 via a second USB interface. Thus, if the electronic device 11 communicates with the portable device 12 via the first wireless module 104, the electronic device 11 still can communicate with other device via the second wireless module 105. On the contrary, if the electronic device 11 communicates with the portable device 12 via the second wireless module 105, the electronic device 11 still can communicate with other device via the first wireless module 104.

The user can use a handwriting function or a multiple language input function in the portable device 12 to transform input characters into a Unicode string. Then, the portable device 12 can transmit the Unicode string via the first wireless module 104 or the second wireless module 105 to the chipset 102 or the controller 103. The chipset 102 or the controller 103 can decode the Unicode string and then can transmit the decoded Unicode string to the operating system of the electronic device 11. For example, the user writes Chinese word on the portable device 12, the portable device 12 then transforms the character into a Unicode string and transmits the Unicode string to the chipset 102. The chipset 102 transforms the Unicode string into characters, thus, the characters can be served as password. In other embodiment, when the controller 103 or the chipset 102 confirms that the Unicode string matches to stored data, the Unicode string can be regarded as a password for the user to login the electronic device.

In another embodiment, when the electronic device 11 is at inactive state, the processor 101, the chipset 102, and the first wireless module 104 are disabled, but the controller 103 and the second wireless module 105 are still powered. The electronic device 11 still can communicate with the portable device 12 via the second wireless module 105. When the user wants to operate the electronic device 11, the electronic device 11 is first booted or woke up by the portable device 12. After the electronic device 11 is woke up or booted, a security login interface is generated. The user first inputs a password generated by a foreign language via the portable device 12, wherein the foreign language is not supported by the input method of the electronic device 11. Then, the user logins in the electronic device 11 by the similar manner described as above. When the operating system or the controller 103 of the electronic device 11 confirms the password matches to the data stored in the electronic device 11, a password input interface or an account/password input interface is displayed, and the user inputs the account and password via an input device of the electronic device 11, such as a keyboard. According to the described manner, the security of the electronic device 11 is enhanced. In another embodiment, the user can direct input the password generated by a foreign language and when the password is confirmed, the user can directly log in or use the electronic device 11.

The operations between the electronic device 11 and the portable device 12 illustrate with the described paragraphs, but not limit the invention thereto. Any skilled person in the art can modify the described functions within the scope of the present application.

Figure 2:
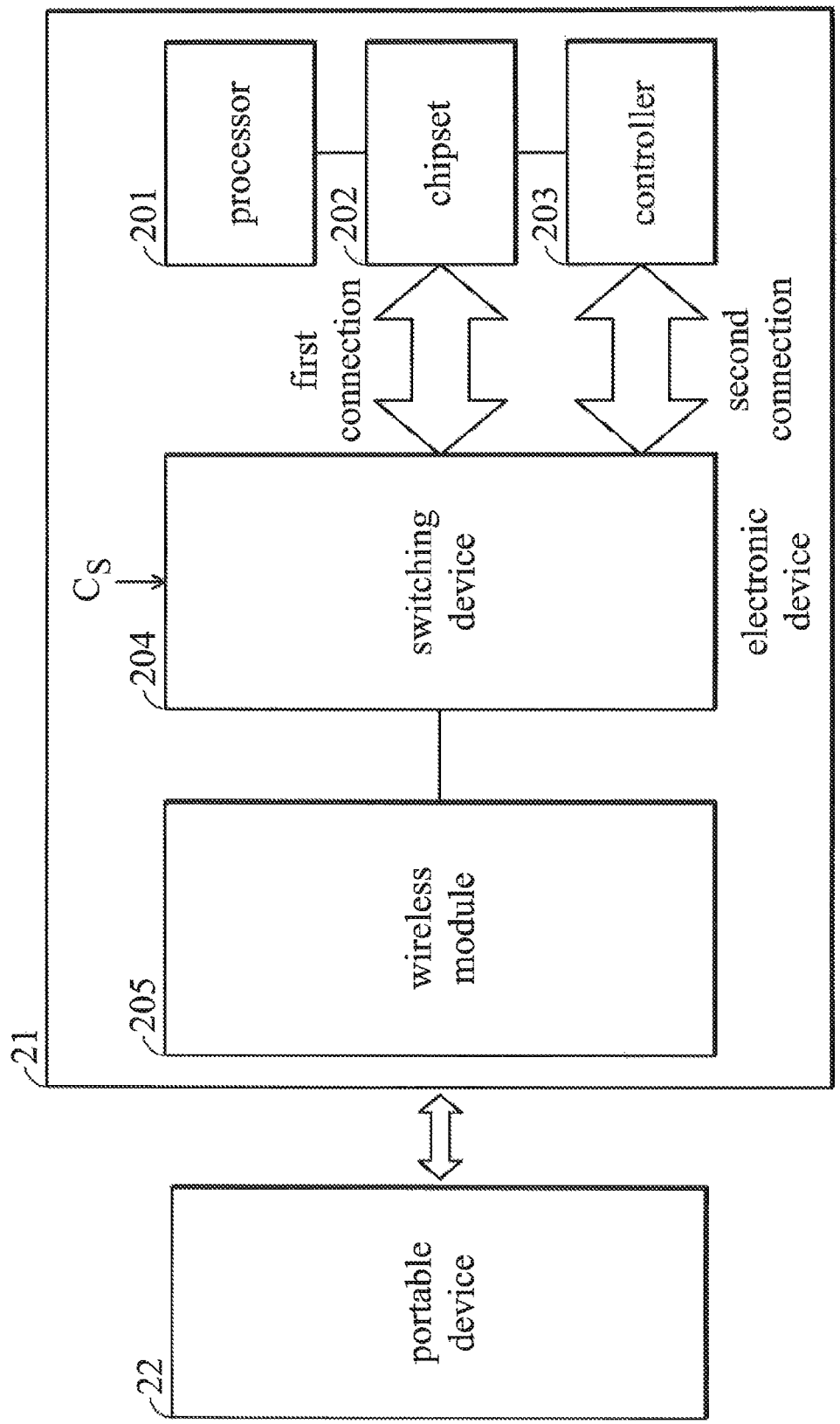
FIG. 2 is a schematic diagram of an electronic device with wireless communication device according to another embodiment of the invention.

FIG. 2 is a schematic diagram of an electronic device with wireless communication device according to another embodiment of the invention. The electronic device 11, such as a computer, can communicate with portable device 12, such as a tablet, via wireless communication device. In this embodiment, the module can be implemented by hardware including chip, controller, storage device or other necessary circuits.

The electronic device 21 includes a processor 201, a chipset 202, a controller 203, a switching device 204 and a wireless module 205. The controller 203 may be a super I/O controller or an embedded controller. The wireless module 205 may be a Bluetooth communication device, a WiFi communication module, an IR communication module, a near field communication (NFC) module, a radio frequency (RF) communication module, a 3 G communication module (including CDMA module, WCDMA module or TD-SCDMA module), a 4 G communication module (including LTE module or WiMAX module) or other wireless module. The switching device 204 can establish a first connection between the wireless module 205 and the chipset 202 or a second connection between the wireless module 205 and the controller 203 according to a select signal Cs. In one embodiment, the select signal Cs is generated by the processor 201. In other words, the switching device 204 determines to transfer the control of the wireless module 205 to the chipset 202 or the controller 203.

In another embodiment, the processor 201 determines to establish the first connection or the second connection according to current state of the electronic device 21. For example, if the loading of the processor 201 is under a threshold, the processor 201 can establish the first connection. If the loading of the processor 201 is higher than the threshold, the processor 201 can establish the second connection. When the switching device 204 establishes the second connection, the signal or data received by the wireless module 205 are processed by the controller 203, not the chipset 202 or the processor 201. The loading is related to the usage of the processor in this embodiment.

In another embodiment, the switching device 204 determines to establish the first connection or the second connection according to a power state of the electronic device 21. When the electronic device 21 is at an operation state, such as the power state S0, the switching device 204 establishes the first connection. When the electronic device 21 is at an inactive state, such as the power state S3 or S5, the switching device 204 establishes the second connection because the controller 203 is powered but the processor 201 and the chipset 202 are not powered. When the second connection is established, the wireless module 205 and the switching device 204 can be powered because the wireless module 205 and the switching device 204 can be connected to the controller 203. In one embodiment, before entering the inactive state, the processor 201 first generates a signal and transmits the signal to the switching device 204. When the switching device 204 receives the signal, the switching device 204 establishes the second connection.

In other words, unless the electronic device 21 does not connect to any power source, the controller 203, the switching device 204 and the wireless module 205 are always powered no matter what the power state of the electronic device 21 is. The processor 201 and the chipset 202 may not be powered by the power source of the electronic device 21 according to the power state of the electronic device 21.

In another embodiment, a first pin of the switching device 204 is connected to a pin of the processor 201 or the chipset 202. When the power state of the electronic device is S3 or S5, the logic state of the pin of the processor 201 and/or the chipset 202 are "0". When the power state of the electronic device is S0, the logic state of the pin of the processor 201 and/or the chipset 202 are "1". Thus, when the logic state of the first pin of the switching device 204 is "0", the switching device 204 establishes the second connection, and when the logic state of the first pin of the switching device 204 is "1", the switching device 204 establishes the first connection. In another embodiment, the first pin can connect to a power pin of the chipset 202. When the chipset 202 is powered, the logic state of the first pin is "1" and the switching device 204 establishes the first connection. If the chipset 202 is not powered, the logic state of the first pin is "0" and switching device 204 establishes the second connection.

In another embodiment, the wireless module 205 is a NFC tag module that does not require power and is not connected to any power source. An external electric field is required for communicating with the NFC tag module. When the NFC tag module is powered by the external electric field, the following functions, including information display function, error diagnostic function or a wakeup function, can be executed.

An application program is installed in the portable device 22. When the application program is executed, the portable device 22 can communicate with the electronic device 21 via a wireless communication interface to acquire information of the electronic device 21 or control the electronic device 21. The following paragraphs describe some operations or functions between the electronic device 21 and the portable device 22.

Information Display Function

When the user uses the portable device 22, the installed application program can transmit a request signal to the electronic device 21 via a wireless module, such as a Bluetooth module (not shown in FIG. 2). If the electronic device 21 is in the operation state, such as power state S0, the switching device 204 can establish the first connection between the wireless module 205 and the chipset 202. When the wireless module 205 receives the request signal, the wireless module 205 transmits the received request signal to the chipset 202. The chipset 202 can acquire information of the electronic device 21 from the sensors or operating system of the electronic device 21 and transmit the information to the portable device 22. The information includes at least one of a temperature, a model, a current voltage, an operating frequency of the processor 201, a fan speed, time information, BIOS version of the electronic device 21, and memory information of the electronic device 21.

If the electronic device 11 is in the inactive state, the switching device 204 establishes the second connection between the Wireless module 205 and the controller 203. When the wireless module 205 receives the request signal, the wireless module 205 transmits the received request signal to the controller 203. Before the electronic device 21 enters the inactive state, the chipset 202 can store the information of the electronic device 21 to a storage device, such as a flash memory or a memory of the controller 203. Thus, when the controller 203 receives the request signal, the controller 203 acquires the information of the electronic device 21 from the storage device and transmits the information to the portable device 22. The information includes at least one of a temperature, a model, a current voltage, an operating frequency of the processor 201, a fan speed, time information, BIOS version of the electronic device 21, and memory information of the electronic device 21.

In another embodiment, some sensors of the electronic device 21 share the same power source of the controller 203, thus these sensors are continuously powered even the electronic device 21 is at the inactive state. The sensors continuously monitor the state of the electronic device 21 and transmit the detected information to the controller 203 continuously or periodically. In other embodiment, some sensors share the same power source of the controller 203 and other remaining sensors share the same power source of the chipset 202. Thus, the remaining sensors may not be powered in some situations.

Error Diagnostic Function

When errors are occurred in the electronic device 21, the electronic device 21 may not operate normally. The switching device 204 then establishes the second connection between the wireless module 205 and the controller 203, thus, the external device can know the abnormal information via the wireless module 205. Since the controller 203 can operate independently, the controller 203 transmits an abnormal signal to the portable device 22 via the wireless module 205 when errors are occurred. In other embodiment, the user can determine whether to transmit a request signal to the controller 203 via the portable device 22.

When the controller 203 receives the request signal, the controller 203 can acquire an error information code and transmit the error information code to the portable device. The controller 203 may acquire the error information code via the port 80. Then, the user can access internet to perform a debugging operation for the electronic device 11 by using the portable device 12 in accordance with the received error information code. In one embodiment, the portable device 22 can transmit the error information code to the internet for debugging.

In another embodiment, the controller 203 or the chipset 202 generates the error information code directly and the controller 203 transmits the error information code to the portable device 22 directly. In another embodiment, the chipset 202 generates the error information code and transmits the error information code to the controller 203. Then, the controller 203 transmits the error information code to the portable device 22. In another embodiment, the controller 203 transmits the error information code to the portable device 22 after receiving the request signal from the portable device 22. The error information code may be an error signal or an error code.

Wakeup Function

When the electronic device 21 is at the inactive state and the electronic device 21 is still connected to a power source, still only the wireless module 205 and the controller 203 are powered and operate normally. The processor 201 and the chipset 202 are disabled or inactive. When the user transmits a booting command to the controller 203 via the portable device 22, the controller 203 transmits corresponding booting signal to the chipset 202 and the electronic device 21 then executes a booting procedure or a wakeup procedure accordingly. The detail operation of the booting procedure or the wakeup procedure can be referred to the related descriptions of FIG. 1, and is not discussed here for briefly.

Security Login Interface

The described security login function can also be applied to the electronic device 21. The detail descriptions can be referred to the related descriptions of FIG. 1, and are not discussed here for briefly.

Wireless Input Function

When the electronic device 21 is in the operation state, such as the power state S0, the portable device 22 can be served as an input device of the electronic device 21. When the electronic device 21 is at the state S0, the switching device 204 establishes the first connection between the wireless module 205 and the chipset 202, and the chipset 202 receives and processes the data from the portable device 22. In another embodiment, the portable device 22 transmits a select signal to the electronic device 21 to control the switching device 204 to establish the first connection or the second connection.

In one embodiment, the wireless module 205 is connected to the switching device 204 via a first USB interface and the switching device 204 is connected to the chipset 202 or an USB controller inside of the controller 203 via a second USB interface.

In another embodiment, when the electronic device 21 is at the inactive state, the processor 201 and the chipset 202 are disabled. The electronic device 21 still can communicate with the portable device 22 via the wireless module 205. The detail descriptions can be referred to the related descriptions of FIG. 1, and are not discussed here for briefly.

The operations between the electronic device 21 and the portable device 22 illustrate with the described paragraphs, but not limit the invention thereto. Any skilled person in the art can modify the described functions within the scope of the present application.

Figure 3:
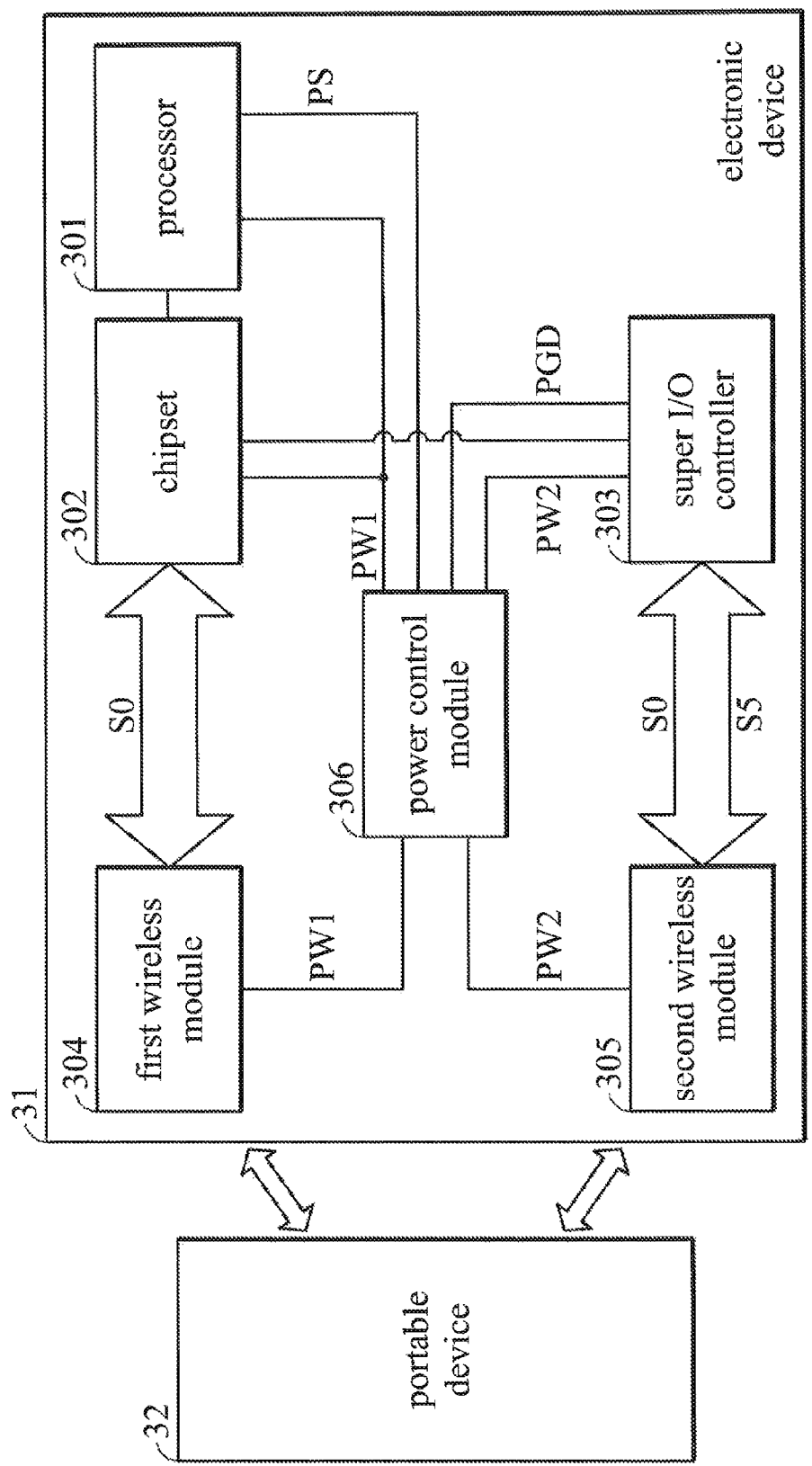
FIG. 3 is a schematic diagram of an electronic device with wireless communication device according to another embodiment of the invention.

FIG. 3 is a schematic diagram of an electronic device with wireless communication device according to another embodiment of the invention. The electronic device 31, such as a computer, can communicate with portable device 32, such as a tablet, smart phone or phablet, via wireless communication device. The wireless communication device may be a Bluetooth communication device, a WiFi communication module, an IR communication module, a near field communication (NFC) module, a radio frequency (RF) communication module, a 3 G communication module (including CDMA module, WCDMA module or TD-SCDMA module), a 4 G communication module (including LTE module or WiMAX module) or other wireless module. In other embodiment, it can be implemented by two different wireless modules. In this embodiment, the module can be implemented by hardware including chip, controller, storage device or other necessary circuits.

The electronic device 31 includes a processor 301, a chipset 302, a super I/O controller 303, a first wireless module 304, a second wireless module 305 and a power control module 306. The power control module 306 can provide a first power PW1 to the first wireless module 304, the chipset 302 and the processor 301. The power control module 306 can provide a second power PW2 to the second wireless module 305 and the super I/O controller 303. The power control module 306 can determine whether to provide the first power PW1 to the first wireless module 304, the chipset 302 and the processor 301 according to a power state signal PS. When the electronic device 31 is at an operation state, the power state signal PS is at a first voltage level, and the power control module 306 can provide the first power PW1 to the first wireless module 304, the chipset 302 and the processor 301. When the electronic device 31 is at an inactive state, the power state signal PS is at a second voltage level, and the power control module 306 stops providing the first power PW1 to the first wireless module 304, the chipset 302 and the processor 301. In this embodiment, the power state signal PS can be provided by the processor 301. In another embodiment, the power state signal PS can be provided by other element, such as the super I/O controller 303, in the electronic device 31.

In this embodiment, when the processor 301 wants to change the power state, the processor 301 can transmit corresponding control signal to the chipset 302. The chipset 302 then transmits the control signal or a signal transformed based on the control signal to the super I/O controller 303. The super I/O controller 303 then controls the power control module 306 to switch power or change the power state. As to the detail of the power control, the descriptions of FIGS. 1 and 2 can be referred and not discussed here for briefly.

In another embodiment, when the electronic device 31 is at the inactive state and the super I/O controller 303 receives a booting command or a wakeup command from the portable device 32, the super I/O controller 303 first transmits a Power Good (PGD) signal to the power control module 306. The power control module 306 provides the first power PW1 to the first wireless module 304, the chipset 302 and the processor 301, and then the super I/O controller 303 transmits a corresponding booting signal to the chipset 302 or the processor 301 to execute a booting procedure or a wakeup procedure.

An application program is installed in the portable device 32. When the application program is executed, the portable device 32 communicates with the electronic device 31 via a wireless interface, such as a Bluetooth interface, to acquire data stored in the electronic device 31 or control the electronic device 31. The related functions can be referred to the descriptions of FIGS. 1 and 2 and not discussed here for briefly.

Although the embodiments in FIGS. 1-3 are illustrated with different electronic devices, the operation or function of the embodiment a be applied in other embodiments. For example, before the super I/O controller transmits booting signal to the chipset or the processor, the chipset or the processor may first receive the power provided by the electronic device.

Figure 4:
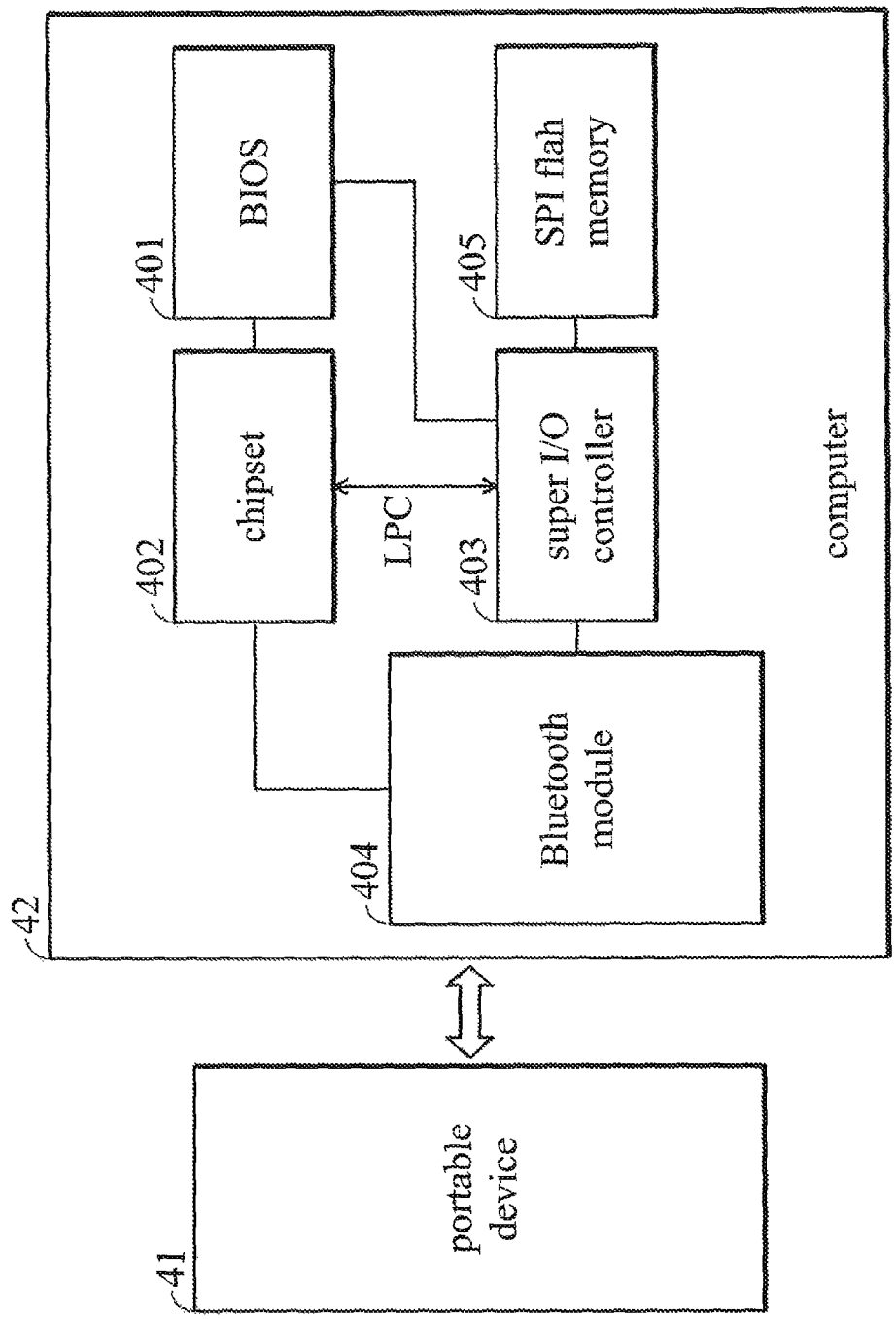
FIG. 4 is a schematic diagram showing updating a BIOS of a computer by a portable device according to an embodiment of the invention.

FIG. 4 is a schematic diagram showing updating a BIOS of a computer by a portable device according to an embodiment of the invention. When the computer 42 is at an inactive state or under an abnormal situation, the user downloads a new version BIOS of the computer 42 via the portable device 41 and transmits a BIOS update command to the computer 42 via an application program installed in the portable device 41, wherein the BIOS is stored in a serial peripheral interface (SPI) flash memory. Since the computer is at the inactive state or under the abnormal situation, the chipset 402 may be disabled, thus, the Bluetooth 404 is controlled by a controller, such as a super I/O controller 403. The embodiment in FIG. 4 is illustrated with the Bluetooth module, but not limited the invention thereto. The Bluetooth module can be replaced by other wireless module, such as WiFi module, IR module, NFC module or other wireless module.

When the computer 42 receives the BIOS update command, the communication between the chipset 402 and the BIOS 401 is disconnected. The super I/O controller 403 can receive the new version BIOS via the Bluetooth module 404 and update the BIOS.

In another embodiment, even when the computer 42 is under a normal situation, the user still can update the BIOS of the computer 42 via the portable device 41. If the Bluetooth module 404 is controlled by the chipset 402, the control of the Bluetooth module 404 is first passed to the super I/O controller 403. Then, the super I/O controller 403 can receive the new version BIOS transmitted from the portable device 41 via the Bluetooth module 404 and stored the new version BIOS in the SPI flash memory (not shown in FIG. 4). After receiving the new version BIOS, the communication between the chipset 402 and the BIOS 401 is disconnected, and the super I/O controller 403 updates the BIOS 401 with the new version BIOS. In other embodiment, the BIOS 401 is updated when the super I/O controller 403 receives the new version BIOS.

In another embodiment, after receiving the new version BIOS, the super I/O controller 403 informs the chipset 402 and the chipset updates the BIOS 401 with the new version BIOS.

In another embodiment, the portable device 41 can update the firmware of the super I/O controller 403, wherein the firmware is stored in the SPI flash memory 405. The updating method can be referred to the above paragraphs, and not discussed here for briefly. In another embodiment, the BIOS 401 and the firmware of the super I/O controller 403 are stored in the same SPI memory (not shown in FIG. 4). The processor reads the BIOS from the SPI flash memory and the super I/O controller 403 reads the firmware from the SPI flash memory.

Although the embodiment in FIG. 4 illustrates with the BIOS updating, but not limit the invention thereto. The user can update drivers, anti-virus software, application programs or the operating system in the same manner.

Figure 5:
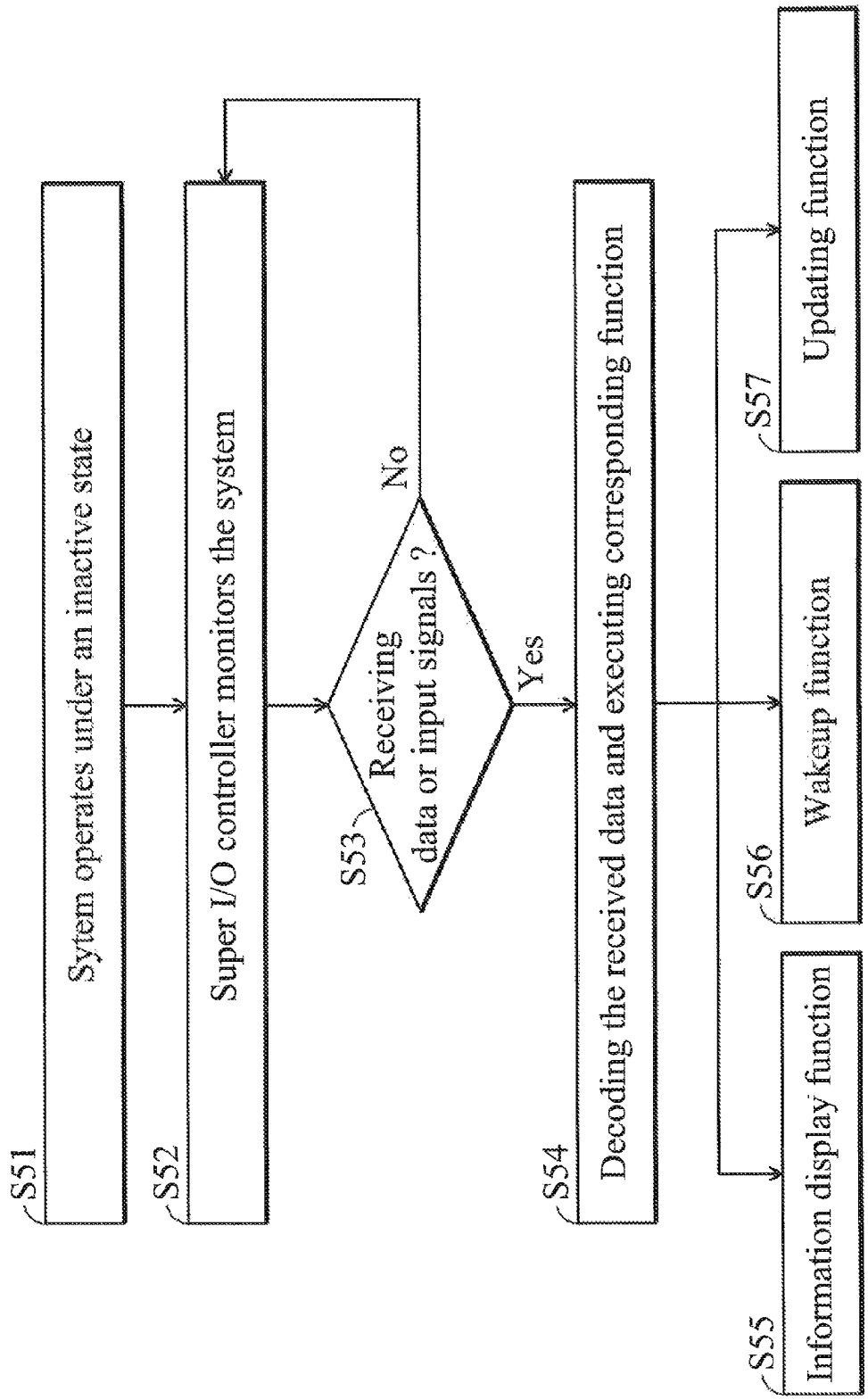
FIG. 5 is a flowchart of an operation method of an electronic device according to an embodiment of the invention.

FIG. 5 is a flowchart of an operation method of an electronic device according to an embodiment of the invention. In the step S51, the computer stays at an inactive state and most elements in the computer, except the super I/O controller and elements have the same power state as the super I/O controller, are not powered. In the step S52, the super I/O controller or the embedded controller continuously monitors states of the computer and determines whether a wireless module of the computer receives a data or an input signal from a portable device (step S53).

In step S53, if the electronic device receives the data or input signal from the portable device, step S54 is executed. Otherwise, the procedure is returned to step S52. In step S54, the super I/O controller decodes the received data or instructions and executes corresponding functions. In this embodiment, the corresponding functions include information display function (step S55), wakeup function (step S56) and updating function (step S57). The detail of these functions can be referred to the descriptions of FIGS. 1-4 and not discussed here for briefly.

Figure 6:
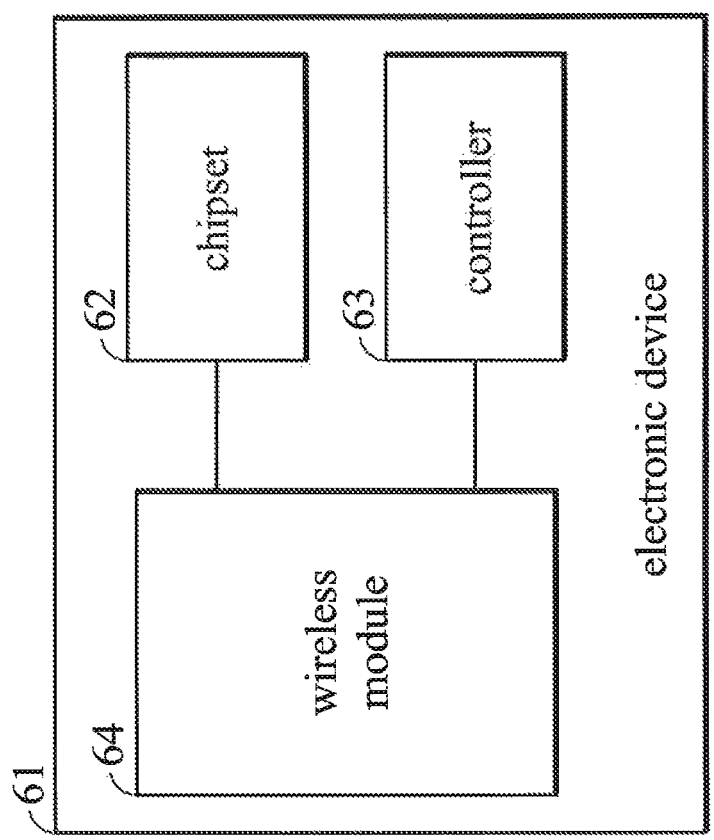
FIG. 6 is a schematic diagram of an electronic device according to an embodiment of the invention.

FIG. 6 is a schematic diagram of an embodiment of an electronic device according to the invention. The electronic device 61 includes a chipset 62, a controller 63 and a wireless module 64. The wireless module 64 can be controlled by the chipset 62 or the controller 63 according to a select signal or user's choice. When the electronic device 61 is at an inactive state, the wireless module 64 can be controlled by controller 63 and has the same power state as the controller 63. It means that if the controller 63 is powered, the wireless module 64 is powered and if the controller 63 is not powered, the wireless module 64 is not powered.

In another embodiment, the electronic device 61 further contains a switching mechanism to transfer the control of the wireless module 64 to the controller 63 or the chipset 62. The related descriptions can be referred to the electronic device 22 of FIG. 2. In another embodiment, the wireless module 64 includes a first wireless module and a second wireless module, wherein the first wireless module is controlled by the chipset 62 and the second wireless module is controlled by the controller 63. When the electronic device is at an operation state, a processor or an operating system of the electronic device 61 selects the first wireless module or the second wireless module to communicate with the portable device. When the electronic device 61 stays in an inactive state, the electronic device 61 communicates with the portable device via the second wireless module, wherein the chipset and the first wireless module are not powered when the electronic device 61 stays in an inactive state. The detail of described select mechanism can be referred to the descriptions of FIGS. 1 and 3 and not discussed here for briefly.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device comprising:
   a first wireless module controlled by a chipset to communicate with a portable device;
   a second wireless module to communicate with the portable device; and
   a controller coupled to the second wireless module, wherein when the electronic device is in an inactive state, and the first wireless module and the chipset are disabled, the controller is configured to communicate with the portable device via the second wireless module;
   wherein the chipset and the first wireless module are at a first power domain and enabled simultaneously, and the controller and the second wireless module are at a second power domain different from the first power domain and enabled simultaneously, and the first wireless module and the second wireless module are physically separated.

2. The electronic device as claimed in claim 1, wherein when the electronic device is at the inactive state, the first power domain stops providing power to the chipset and the first wireless module, and the second power domain continuously provides power to the controller and the second wireless module.

3. The electronic device as claimed in claim 1, wherein when the electronic device is in the inactive state and the first wireless module and the chipset are disabled, the second wireless module is switched on, so that the controller is configured to communicate with the portable device via the second wireless module.

4. The integrated device as claimed in claim 1, wherein when the electronic device is at an operation state, the electronic device selects the first wireless module or the second wireless module to communicate with the portable device according to a select signal.

5. The integrated device as claimed in claim 4, wherein the select signal is generated by a processor of the electronic device.

6. An integrated circuit to process an input/output signal of an electronic device, comprising:
   a controller; and
   a switching device, coupled to the wireless module and is selectively coupled to the controller or a chipset, so as to establish a first connection between the wireless module and the chipset, or a second connection between the wireless module and the controller;
   wherein when the electronic device is at an inactive state, the switching device establishes the second connection and the controller is configured to communicate with a portable device via the wireless module, receive a signal from the portable device, and execute a corresponding function, wherein the corresponding function is an information display function or an update function,
   wherein when the corresponding function is the information display function, the controller transmits an information of the electronic device to the portable device, and the information comprises at least one of a temperature, a model, a current voltage, an operating frequency of a processor, a fan speed, a time information, a BIOS version of the electronic device, and memory information of the electronic device,
   wherein when the corresponding function is the update function and the controller receives the signal, the controller receives an update information via the wireless module to update a BIOS, a firmware, or a software of the electronic device.

7. The integrated circuit as claimed in claim 6, wherein the controller and the chipset are two independent elements.

8. The integrated circuit as claimed in claim 6, wherein when the electronic device is at an operation state, the switching device establishes the first connection or the second connection according to a select signal, wherein the select signal is generated by a processor of the electronic device.

9. The integrated circuit as claimed in claim 6, wherein when the switching device establishes the first connection, the wireless module and the chipset are at a first power domain, and when the switching device establishes the second connection, the wireless module and the controller are at a second power domain which is not the first power domain.

10. The integrated circuit as claimed in claim 6, wherein the controller receives the signal and executes the corresponding function.

11. The integrated circuit as claimed in claim 6, wherein when the electronic device is at an operation state, the chipset receives an unlock command transmitted from the portable device and confirms whether the unlock command matches to data stored in the electronic device to determine whether a user is allowed to log in the electronic device.

12. The integrated circuit as claimed in claim 10, wherein the function is a wakeup function, and when the controller receives the signal, the controller transmits a wakeup signal to the chipset or a processor to execute a booting procedure or a wakeup procedure.

13. The integrated circuit as claimed in claim 10, wherein the function is an error diagnostics function, the controller transmits an error information to the portable device, and the portable device executes a debug procedure according to the error information.

14. The integrated circuit as claimed in claim 6, wherein the wireless module is a Bluetooth Module or an NFC module.

15. An operation method for an electronic device, wherein the electronic device comprises a chipset, a controller and a wireless module controlled by the chipset or the controller, the method comprises:
   detecting a state of the electronic device;
   establishing a first connection between the controller and the wireless module when the state is an inactive state, so as to enable the controller to receive an input signal from a portable device;
   establishing a second connection between the chipset and the wireless module when the state is an operation state, so as to enable the chipset to receive the input signal from the portable device; and
   executing a function corresponding to the input signal.

16. The method as claimed in claim 15, wherein the function is a wakeup function, and when the controller receives the input signal, the controller transmits a wakeup signal to the chipset or a processor to execute a booting procedure or a wakeup procedure.

17. The method as claimed in claim 15, wherein the input signal is an Unicode string that is generated according to a first string corresponding to a first language input by a user via the portable device, and when the controller or the chipset confirms that the Unicode string matches to a data stored in the electronic device, the user is allowed to log in the electronic device.

18. The method as claimed in claim 15, wherein when the electronic device is at the inactive state, the controller receives the input signal to execute an information display function and the controller transmits an information to the portable device, wherein the information comprises at least one of a temperature, a model, a current voltage, an operating frequency of a processor, a fan speed, a time information, a BIOS version of the electronic and memory information of the electronic device.

19. The method as claimed in claim 15, wherein when the electronic device is at the inactive state, the controller receives the input signal to execute an error diagnostics function, the controller transmits an error information to the portable device or a server to execute a debug procedure.

20. The method as claimed in claim 15, further comprising disabling the chipset when the electronic device is in the inactive state, so that the controller communicates with the portable device via the first connection between the wireless module and the controller.

* * * * *